US009802446B2

(12) United States Patent
Dahlke et al.

(10) Patent No.: US 9,802,446 B2
(45) Date of Patent: Oct. 31, 2017

(54) SELF-SEALING TIRE SEALANT AND PNEUMATIC VEHICLE TIRE

(71) Applicant: Continental Reifen Deutschland GmbH, Hannover (DE)

(72) Inventors: Markus Dahlke, Wunstorf (DE); Dieter Jeromin, Hannover (DE); Joe Guardalabene, Hannover (DE); Thomas Völker, Seelze (DE); Fei Liu, Hannover (DE); Andreas Tyburski, Ilsede (DE); Martin Convey, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 15/427,302

(22) Filed: Feb. 8, 2017

(65) Prior Publication Data

US 2017/0144491 A1 May 25, 2017

Related U.S. Application Data

(63) Continuation of application No. PCT/EP2014/066451, filed on Jul. 31, 2014, and a continuation of application No. 15/025,773, filed on Mar. 29, 2016, now abandoned.

(30) Foreign Application Priority Data

Oct. 2, 2013 (DE) ........................ 10 2013 110 977

(51) Int. Cl.

| | |
|---|---|
| ***B60C 9/00*** | (2006.01) |
| ***B60C 9/12*** | (2006.01) |
| ***B60C 19/12*** | (2006.01) |
| ***B29C 73/02*** | (2006.01) |
| ***B29C 73/16*** | (2006.01) |
| ***B29D 30/06*** | (2006.01) |
| ***C08J 9/14*** | (2006.01) |
| ***C08J 9/00*** | (2006.01) |
| *B29K 105/04* | (2006.01) |
| *B29L 30/00* | (2006.01) |

(52) U.S. Cl.

CPC .............. *B60C 19/12* (2013.01); *B29C 73/02* (2013.01); *B29C 73/163* (2013.01); *B29D 30/0685* (2013.01); *C08J 9/0066* (2013.01); *C08J 9/141* (2013.01); *B29K 2105/048* (2013.01); *B29L 2030/00* (2013.01); *C08J 2203/14* (2013.01); *C08J 2203/22* (2013.01); *C08J 2323/20* (2013.01); *C08J 2323/22* (2013.01)

(58) Field of Classification Search

CPC .............................. B60C 19/12; B60C 19/122
See application file for complete search history.

(56) References Cited

U.S. PATENT DOCUMENTS

| | | | |
|---|---|---|---|
| 4,068,027 A | 1/1978 | Van Ornum | |
| 4,113,799 A | 9/1978 | Van Ornum et al. | |
| 2010/0036023 A1 | 2/2010 | Weng et al. | |
| 2011/0315291 A1 | 12/2011 | Abad et al. | |
| 2012/0234449 A1* | 9/2012 | Greiveldinger ....... | B29C 73/163 152/502 |

FOREIGN PATENT DOCUMENTS

| | | | |
|---|---|---|---|
| CN | 1553866 A | | 12/2004 |
| CN | 101381517 A | | 3/2009 |
| DE | 102007035192 A1 | | 1/2009 |
| JP | 2006-213930 | * | 8/2006 |
| WO | 2008/141848 A1 | | 11/2008 |

OTHER PUBLICATIONS

CN Office Action dated Dec. 23, 2017 corresponding foreign application claiming priority PCT/EP2014/066451.

* cited by examiner

*Primary Examiner* — Kara Boyle

(57) ABSTRACT

Self-sealing tire sealants are provided which contain fragments and/or residues of expanded solids, where the solids are selected from the group containing expandable graphite and microspheres. In some aspects, the microspheres include at least isobutane and/or isopentane as blowing agents. The microspheres may also have a shell containing at least one polymer, and in some cases the polymer is at least one copolymer of acrylonitrile and methyl acrylate. The self-sealing tire sealant may further include graphene structures. In some aspects the interior of a pneumatic vehicle tire has the self-sealing tire sealant disposed on the inner surface, opposite the tire tread, and the layer thickness of the tire sealant may be from 0.5 to 8 mm.

10 Claims, No Drawings

SELF-SEALING TIRE SEALANT AND PNEUMATIC VEHICLE TIRE

CROSS REFERENCE TO RELATED APPLICATIONS

This application is a continuation application of co-pending U.S. patent application Ser. No. 15/025,773, filed Mar. 29, 2016, which in turn is a continuation application of international patent application PCT/EP2014/066451, filed Jul. 31, 2014, designating the United States and claiming priority from German application 10 2013 110 977.2, filed Oct. 2, 2013, and the entire content of these applications is incorporated herein by reference.

FIELD OF THE INVENTION

The invention relates to a self-sealing tire sealant and to a pneumatic vehicle tire having a self-sealing tire sealant applied beforehand in the tire interior to the inner surface opposite the tread.

BACKGROUND

It is known practice to equip pneumatic vehicle tires in such a way that they behave self-sealingly if the tire is punctured, damaged.

Accordingly, for example, U.S. Pat. No. 4,068,027 and U.S. Pat. No. 4,113,799 disclose a tire sealant based on a crosslinked butyl rubber. The tire sealant in these cases consists of two components. There, however, the rubbers employed are diluted using solvents which are combustible and harmful to health.

DE 102007035192 A1, for the purpose of avoiding these disadvantages, describes a tire sealant which comprises as sealant component a filler whose sealing effect results from its structure, the filler being pressed against the inner tire wall by the centrifugal force during traveling, and becoming built up in the process in layer form on and/or in and/or over the damage site or incision site. Muscovite mica was used as filler in DE 102007035192 A1. Fillers of this kind, particularly mica, have the disadvantage, however, that as relatively large-surface-area phyllosilicates, they impair the adhesion between the foreign body that has penetrated and the sealant. In the majority of cases, moreover, the greater density of the filler as compared with the sealant increases the mass of the tire, leading in turn to a reduced performance at high speed.

SUMMARY

This section provides a general summary of the disclosure, and is not a necessarily a comprehensive disclosure of its full scope or all of its features.

In some embodiments of the disclosure, self-sealing tire sealants are provided which contain fragments and/or residues of expanded solids, where the solids are selected from the group containing expandable graphite and microspheres. In some aspects, the microspheres include at least isobutane and/or isopentane as blowing agents. The microspheres may also have a shell containing at least one polymer, and in some cases the polymer is at least one copolymer of acrylonitrile and methyl acrylate. The self-sealing tire sealant may further include graphene structures. In some aspects the interior of a pneumatic vehicle tire has the self-sealing tire sealant disposed on the inner surface, opposite the tire tread, and the layer thickness of the tire sealant may be from 0.5 to 8 mm.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

It is an object of the invention to provide a self-sealing tire sealant which in comparison to the prior art has a low density (mass per unit volume) and a high sealing effect per unit mass. Sealing effect refers to the sealing by flow into a defect site, arising for example from damage to a tire with a nail, and blocking of this defect site, and also airtightness.

The stated object is achieved in accordance with the invention by the tire sealant comprising fragments and/or residues of expanded solids, the solids being selected from the group containing expandable graphite and microspheres.

It is further conceivable for the solid to comprise glass beads.

"Fragments of expanded solids" in the context of the present invention means that the solids after having expanded are no longer in the same form as they were prior to having expanded, but are instead, as a result of the three-dimensional expansion, in the form of solid fragments.

"Residues of expanded solids" in the context of the present invention means that the solids after having undergone expansion are no longer present in the same form as before expansion, but instead, as a result of the three-dimensional expansion, are in an altered form, but do not have any fragments. It is conceivable accordingly, for example, in the case of expanded microspheres, for the shell to have undergone three-dimensional expansion without having broken up into fragments, since, as elucidated below, the shell of the microspheres used for the purposes of the present invention is stretchable and is extended by the expansion of the blowing gas.

The solids are preferably selected from the group consisting of expandable graphite and microspheres. The tire sealant therefore preferably comprises fragments and/or residues of expanded microspheres and/or fragments and/or residues of expanded expandable graphite, or the tire sealant preferably comprises expanded microspheres and/or expanded expandable graphite. As a result, the tire sealant has a lower density and hence a lower weight in application in the tire, which in turn brings advantages in terms of fuel consumption. Furthermore, a pneumatic vehicle tire containing the tire sealant of the invention features an equivalent or even improved sealing effect, particularly airtightness and sealing effect, by virtue of the possibility of using the same layer thickness or thicker for the sealant, relative to the prior art, for the same weight of sealant. Depending on the layer thickness of the sealant, accordingly, it is possible for the tire to be designed more economically and/or with greater performance in terms of the sealing effect.

According to one preferred embodiment of the invention, the total amount of expanded solid in the tire sealant is 1 to 20 wt %, more preferably 1 to 10 wt %.

Microspheres for the purposes of the present invention are particles whose diameter is in the micrometer range. The skilled person is aware both of consistently solid microspheres and of internally hollow microspheres. For the purposes of the present invention, consideration is given only to hollow microspheres, which on the outside have a stretchable shell and on the inside have at least one gas. The gas or gas mixture in the interior of the microspheres is also referred to as blowing agent.

The hollow microspheres can be subdivided into expandable or expanded microspheres.

The tire sealant of the invention, according to one particularly preferred embodiment, comprises expanded microspheres, where the blowing agent has undergone expansion, as a result of prior heating, for example, and so the shells of the microspheres are distended. As a result of this, the tire sealant has closed and/or open pores which comprise at least one gas. The gas is a mixture of air and blowing agent and also, optionally, chemical derivatives of the blowing agent. Prior to being expanded, the microspheres present in the tire sealant preferably have a diameter of 0.5 to 50 μm (micrometers), more preferably 0.5 to 40 μm, very preferably 1 to 40 μm, very preferably in turn 10 to 30 μm.

The shell of the microspheres present in the tire sealant of the invention is preferably constructed from at least one polymer and more preferably comprises a copolymer of acrylonitrile and methyl acrylate. The shell of the microspheres may further comprise magnesium oxide (MgO). Accordingly, when microspheres are present, the tire sealant has fragments and/or residues of the expanded shell of the microspheres of acrylonitrile and methyl acrylate and also, optionally, MgO. It is conceivable here both for the shell of the expanded microspheres to be present in the form of fragments, and for the shell to be present as a residue in the form of a consistent shell.

In the case of the tire sealant of the invention, the shell of the expanded microspheres may be attached chemically into the polymer matrix of the tire sealant by way of the sulfur network of the tire sealant. Alternatively, the shell of the microspheres may be such that it can no longer be attached via crosslinking to the network of the tire sealant.

The thickness of the shell of the microspheres present in the tire sealant, prior to expansion, is preferably 0.1 to 5 μm (micrometers).

The blowing agent of the microspheres present in the tire sealant of the invention preferably comprises isobutane and/or isopentane.

In the context of the present invention it is conceivable for the tire sealant of the invention to comprise a mixture of microspheres which have a different diameter and which, starting from their original diameter, have undergone expansion to differing extents, it also being conceivable for some microspheres to have undergone little or no expansion and therefore to have retained their initial diameter. After expansion, accordingly, the diameter of the microspheres is 0.5 to 250 μm, preferably 0.5 to 100 μm, more preferably 80 to 100 μm. This means that with particular preference all the microspheres are expanded.

On expansion, the outwardly solid structure of the microspheres remains wholly and/or partly in tact. This means that the shell is stretchable and is widened as a result of the propagation of the gas through heating, for example—in other words, the microspheres undergo three-dimensional expansion.

Where the tire sealant of the invention comprises only expanded microspheres as expanded solids, the amount of microspheres, based on the total amount of the tire sealant, is 0.5 to 3 wt %, preferably 0.5 to 2.5 wt %, more preferably 1.0 to 2.5 wt %, very preferably 1.8 to 2.2 wt %. By this means the sealing effect achieved is particularly good, in conjunction with a low density for the tire sealant of the invention.

Expandable graphite for the purposes of the present invention refers to graphite having a layer lattice structure, where atoms or molecules, more particularly sulfur compounds or nitrogen compounds, are incorporated, in other words intercalated, between the layers. Preferably at least sulfuric acid molecules, these being molecules of the empirical formula $H_2SO_4$, are intercalated in the expandable graphite.

According to Römpp Online Lexikon, version 3.36, "graphene is a planar, hexagonal arrangement of carbon atoms, corresponding in its structure to a monomolecular layer of graphite (honeycomb structure)".

In the case of expandable graphite, accordingly, the intercalated compounds are located between individual graphene layers. Ideally, the intercalated compound is located between every monolayer of the graphite. In reality, however, it is conceivable for certain graphite layers to have no intercalated compounds.

On heating, expandable graphite undergoes three-dimensional expansion, as a result of which the intercalated compound, preferably at least one nitrogen or sulfur compound, releases preferably $SO_2$ and/or $H_2SO_4$, and/or derivatives thereof, and, moreover, graphene structures are formed in the tire sealant. Consequently, if expandable graphite is present, the tire sealant comprises graphene structures as fragments of the expanded expandable graphite. In other words, the tire sealant of the invention comprises graphene if it comprises expanded expandable graphite. These structures occur mainly ideally, although it is also conceivable for structures to be formed in which a number of graphite layers are still sticking to one another (see above), and so the tire sealant of the invention comprises graphite and/or graphene.

The tire sealant of the invention, according to one particularly preferred embodiment, comprises expanded expandable graphite, with the tire sealant comprising graphene structures which form as a result of expansion of the expandable graphite, through heating, for example. Alternatively, pre-expanded graphite may also be mixed into the tire sealant.

The graphene structures present in the tire sealant in accordance with these embodiments result in good airtightness on the part of the tire sealant.

Moreover, expandable graphite has the advantage of flame retardance. The expandable graphite contained within the tire sealant of the invention is expanded preferably at a temperature of 130° C. or more, preferably 150° C. or more, more preferably 150° C. to 230° C., very preferably 170 to 230° C. The expandable graphite used in the method of the invention preferably has a pre-expansion particle size of 0.5 to 1500 μm (micrometers), more preferably 200 to 1500 μm, very preferably 200 to 1000 μm. The expandable graphite present in the tire sealant of the invention preferably comprises at least intercalated sulfuric acid, $H_2SO_4$.

Where the only expanded solid in the tire sealant of the invention is expanded expandable graphite, the amount of expandable graphite, based on the total amount of the tire sealant, is 0.5 to 10 wt %, preferably 0.5 to 8 wt %, more preferably 2.0 to 8 wt %, very preferably 3 to 8 wt %. As a result of this, the sealing effect achieved is particularly good, in conjunction with a low density for the tire sealant of the invention.

It is further conceivable for the tire sealant, in accordance with one embodiment of the invention, to comprise, for example, microspheres and expandable graphite in combination. In this case, the features of the microspheres and of the expandable graphite are likewise subject to the preferred features stated under the other embodiments, such as expansion temperature range and pre-expansion particle size.

The diameter of the microspheres discussed in the context of the present invention, and the particle size of the expandable graphite, are determined by light microscopy. Particle size here refers to the maximum possible spacing in the two-dimensional projection of an expandable graphite particle under the light microscope.

Since microspheres are spherical in form, the diameter here as well is the maximum possible spacing in the two-dimensional projection under the light microscope.

The sealant of the invention comprises at least one polymer.

The polymer of the tire sealant may be any polymer known in the prior art for tire sealants of pneumatic vehicle tires. The polymer preferably comprises polyurethane (PU) and/or polyisobutylene (PIB) and/or polybutene (PB) and/or butyl rubber (isobutylene-isoprene copolymer, IIR) and/or silicone rubber. With particular preference the tire sealant of the invention comprises at least butyl rubber as polymer. As a result of this, in those embodiments of the invention where the tire sealant comprises microspheres, these microspheres are able, via their shell and the sulfur network that is present in the case of butyl rubber, to attach to the butyl rubber matrix, resulting in improved fatigue resistance on the part of the tire sealant.

The tire sealant of the invention comprises at least one crosslinker.

Crosslinkers contemplated include all of the crosslinkers known to the skilled person. The tire sealant of the invention preferably comprises at least sulfur as crosslinker, particularly if butyl rubber is included as polymer.

The tire sealant may further comprise customary constituents. These include, in particular, at least one activator, such as zinc oxide (ZnO), for example, and/or plasticizers, such as paraffinic or naphthenic oil, for example, and/or one or more processing aids, such as alkyl resins or phenolic resins, for example, and/or one or more fillers, such as carbon black or silica, for example, and/or one or more aging inhibitors, e.g., PPDs.

A further object of the invention is to provide a pneumatic vehicle tire having a self-sealing tire sealant applied beforehand in its interior, on the inner surface opposite the tread, said tire having a lower weight in comparison to the prior art, the intention being that the sealing effect should not be negatively impaired and/or should be improved. The other properties, such as, in particular, abrasion behavior and/or wet braking and/or dry braking and/or handling behavior, and/or the tear properties, and/or the rolling resistance behavior, are not to be deleteriously influenced.

The stated object is achieved in accordance with the invention by the pneumatic vehicle tire having in its interior, on the inner surface opposite the tread, the tire sealant of the invention described above. All of the features and embodiments stated above apply here to the tire sealant.

The pneumatic vehicle tire of the invention, comprising fragments and/or residues of expanded solids in the tire sealant, therefore has a lower tire weight by virtue of the lower density of the tire sealant. The expanded solids are preferably fragments of expanded expandable graphite, i.e., graphene structures, and/or fragments and/or residues of expanded microspheres as describe above.

Furthermore, in the embodiments in which the expanded solid comprises expandable graphite, the pneumatic vehicle tire of the invention features improved flame retardance in comparison to the prior art, with the same or an improved sealing effect in the event of breakdown, owing to the good airtightness of the expandable graphite and/or of the graphene or graphene-like structures formed from it.

Furthermore, in the embodiments in which the expanded solid comprises microspheres, the pneumatic vehicle tire of the invention has the same or an improved sealing effect in comparison to the prior art.

The layer thickness of the tire sealant of the pneumatic vehicle tire of the invention is a layer thickness known in the prior art. The pneumatic vehicle tire implemented in accordance with the invention therefore has a lower weight than a pneumatic vehicle tire whose tire sealant is configured without gas-filled pores, with the sealing effect being the same as and/or improved relative to the prior art.

The layer thickness of the tire sealant is preferably between 0.5 mm and 8 mm. These layer thicknesses correspond to layer thicknesses known in the prior art for tire sealants in pneumatic vehicle tires.

The inner surface of the pneumatic vehicle tire, to which the tire sealant is applied, is preferably an airtight implementation of an inner layer (also referred to in the art as inner liner or innerliner) or the radially innermost carcass ply. For sufficient airtightness on the part of the pneumatic vehicle tire, the pneumatic vehicle tire of the invention has the tire sealant preferably on the airtight inner layer.

EXAMPLES

The invention is elucidated below with reference to working examples of pneumatic vehicle tires. Here, the examples labeled "C" are comparative examples, whereas the examples labeled "I" are inventive examples.

C1:

Production of the tire sealant from two components A and B, using amounts of the substances indicated that are known in the prior art:

Production of component A: mixing of butyl rubber, sulfur (crosslinker), and paraffinic oil, using apparatus and process steps as described in WO 2008/141848 A1.

Component B: polybutene solution and zinc oxide (activator) were mixed with one another, using apparatus and process steps as described in WO 2008/141848 A1.

Components A and B were mixed with one another at a temperature of 100 to 140° C., using apparatus and process steps as described in WO 2008/141848 A1.

The mixture of A and B (tire sealant) was sprayed via a nozzle onto the inner surface, opposite the tread, of a vulcanized pneumatic vehicle tire, the sealant being applied with a layer thickness of 4 mm.

C2:

Like C1, except that the layer thickness of the tire sealant after application was 2.4 mm.

I1:

Like C2, with the difference that in component B, microspheres (2 wt % of microspheres, based on the total mass of the tire sealant, in other words on the total amount of the constituents in A and B), trade name Expancel 031 DUX 40, were mixed into the polybutene solution. The layer thickness after the expansion of the microspheres (expansion through the heat arising during the mixing of components A and B) is comparable with the layer thickness from C1.

C3:

Like I1, with the difference that the tire sealant comprises 4 wt % of microspheres (based on the total mass of the tire sealant, in other words on the total amount of the constituents in A and B) and the layer thickness prior to expansion was 1.5 mm. After expansion, the layer thickness is comparable with the layer thickness from C1 and I1.

All of the pneumatic vehicle tires were weighed and tested for their airtightness. In this case, each tire was damaged using nails and measured for loss of pressure on the tire test stand. In the case of no loss of pressure, the tire is evaluated as being airtight, since the tire sealant seals the defect site (tire airtightness: yes).

TABLE 1

| | Unit | C1 | C2 | I1 | C3 |
|---|---|---|---|---|---|
| Microspheres in the tire sealant | wt % | — | — | 2 | 4 |
| Layer thickness before expansion | mm | 4.0 | 2.4 | 2.4 | 1.5 |
| Layer thickness after expansion | mm | 4.0 | 2.4 | 3.7 | 3.6 |
| Weight of pneumatic vehicle tire | kg | 11.2 | 10.8 | 10.7 | 10.4 |
| Density of tire sealant | g/cm$^3$ | 0.95 | 0.95 | 0.81 | 0.52 |
| Pneumatic vehicle tire airtightness | yes/no | yes | no | yes | no |

As is apparent from table 1, in comparison to the comparative example C1, at comparable layer thickness of the tire sealant after expansion of the microspheres present in I1, the inventive pneumatic vehicle tire I1 has a lower tire weight. The weight reduction is attributable to the lower density of the tire sealant of the inventive examples.

As shown by comparative example C2, the reduction in the layer thickness of the tire sealant without addition of microspheres does not result in sufficient airtightness. Too large an amount of microspheres reduces the sealing effect, owing to the change in rheology of the tire sealant, as is apparent from comparative example C3.

The foregoing description of the embodiments has been provided for purposes of illustration and description. Example embodiments are provided so that this disclosure will be sufficiently thorough, and will convey the scope to those who are skilled in the art.

Numerous specific details are set forth such as examples to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

We claim:

1. A pneumatic vehicle tire comprising a tread, an inner layer, and a tire sealant disposed upon the inner layer and opposite the tread;

wherein the tire sealant comprises expanded solids comprising expandable graphene structures and microspheres;

wherein the expanded solids are incorporated into the tire sealant in an amount of from 1 wt % to 20 wt %; and, wherein the tire sealant provides sealing by flowing into a defect site penetrating the tread and the inner layer.

2. The pneumatic vehicle tire of claim 1, wherein the microspheres comprise at least one of isobutane and isopentane as blowing agents.

3. The pneumatic vehicle tire of claim 1, wherein the microspheres comprise a shell comprising at least one polymer.

4. The pneumatic vehicle tire of claim 1, wherein the pneumatic vehicle tire is vulcanized and then the tire sealant is sprayed onto the inner layer.

5. The pneumatic vehicle tire of claim 1, wherein the tire sealant has a layer thickness of from 0.5 to 8 mm.

6. A pneumatic vehicle tire comprising a tread, an inner layer, a defect site penetrating the tread and the inner layer, and a tire sealant disposed upon the inner layer and opposite the tread;

wherein the tire sealant comprises expanded solids comprising expandable graphene structures and microspheres;

wherein the expanded solids are incorporated into the tire sealant in an amount of from 1 wt % to 20 wt %;

wherein the tire sealant provides sealing by flowing into the defect site penetrating the tread and inner layer; and, provided the tire sealant is not an innerliner of the pneumatic vehicle tire.

7. The pneumatic vehicle tire of claim 6, wherein the microspheres comprise at least one of isobutane and isopentane as blowing agents.

8. The pneumatic vehicle tire of claim 6, wherein the microspheres comprise a shell comprising at least one polymer.

9. The pneumatic vehicle tire of claim 6, wherein the pneumatic vehicle tire is vulcanized and then the tire sealant is sprayed onto the inner layer.

10. The pneumatic vehicle tire of claim 6, wherein the tire sealant has a layer thickness of from 0.5 to 8 mm.

* * * * *